(12) United States Patent
Shirvanian et al.

(10) Patent No.: US 9,178,230 B2
(45) Date of Patent: Nov. 3, 2015

(54) FUEL CELL HAVING PERFORATED FLOW FIELD

(75) Inventors: Alireza Pezhman Shirvanian, Ann Arbor, MI (US); Shinichi Hirano, West Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 1798 days.

(21) Appl. No.: 12/421,025

(22) Filed: Apr. 9, 2009

(65) Prior Publication Data

US 2010/0261087 A1   Oct. 14, 2010

(51) Int. Cl.
| | |
|---|---|
| *H01M 8/24* | (2006.01) |
| *H01M 8/04* | (2006.01) |
| *H01M 8/02* | (2006.01) |
| *H01M 8/10* | (2006.01) |

(52) U.S. Cl.
CPC ........ *H01M 8/04156* (2013.01); *H01M 8/0258* (2013.01); *H01M 8/0297* (2013.01); *H01M 8/04171* (2013.01); *H01M 8/04179* (2013.01); *H01M 2008/1095* (2013.01); *Y02E 60/50* (2013.01)

(58) Field of Classification Search
CPC .................................................. H01M 8/0258
USPC ........................................... 429/514, 518, 457
See application file for complete search history.

(56) References Cited

U.S. PATENT DOCUMENTS

| | | | |
|---|---|---|---|
| 6,503,653 B2 | 1/2003 | Rock | |
| 6,893,708 B2 * | 5/2005 | Shen et al. | 428/188 |
| 7,479,342 B2 * | 1/2009 | Hasegawa et al. | 429/444 |
| 7,662,495 B2 * | 2/2010 | Rapaport et al. | 429/414 |
| 2007/0105000 A1 | 5/2007 | Chapman et al. | |

FOREIGN PATENT DOCUMENTS

| | | |
|---|---|---|
| DE | 102005002924 | 7/2006 |
| TW | 232609 B | 5/2005 |

* cited by examiner

*Primary Examiner* — Tracy Dove
(74) *Attorney, Agent, or Firm* — Damian Porcari; Brooks Kushman P.C.

(57) ABSTRACT

A fuel cell system includes a bipolar plate having a flow field formed therein. The flow field is partially defined by at least two adjacent channel portions separated by a wall portion. The wall portion includes a surface at least partially defining a passageway between the channel portions. The passageway may be sized so as to create a pressure difference between the channel portions. The pressure difference may draw at least a portion of a liquid droplet obstructing one of the channel portions toward and into the passageway.

13 Claims, 4 Drawing Sheets

FUEL CELL HAVING PERFORATED FLOW FIELD

BACKGROUND

1. Field

The invention relates to fuel cells having perforated flow fields.

2. Discussion

A fuel cell is an electrochemical conversion device that produces electricity from a fuel and oxidant that react in the presence of an electrolyte.

Referring now to FIG. 1, a prior art fuel cell 10 includes a membrane electrode assembly (MEA) 12 sandwiched between a pair of flow-field plates 14, 16. The MEA 12 includes a proton exchange membrane (PEM) 18 and catalyst layers 20, 22 bonded to opposite sides of the PEM 18. The MEA 12 further includes gas diffusion layers 24, 26 (anode, cathode respectively) each in contact with one of the catalyst layers 20, 22. As apparent to those of ordinary skill, the gas diffusion layer 24 and catalyst layer 20 may collectively be referred to as an electrode. Likewise, the gas diffusion layer 26 and catalyst layer 22 may also collectively be referred to as an electrode.

The flow-field plate 14 includes at least one channel 28n. As known in the art, the at least one channel 28n may form a spiral, "S," or other shape on the face of the flow-field plate 14 adjacent to the anode 24. Hydrogen from a hydrogen source (not shown) flows through the at least one channel 28n to the anode 24. The catalyst 20 promotes the separation of the hydrogen into protons and electrons. The protons migrate through the PEM 18. The electrons travel through an external circuit 30 to produce electrical power.

The flow-field plate 16 also includes at least one channel 32n. Similar to the at least one channel 28n, the at least one channel 32n may form a spiral, "S," or other shape on the face of the flow-field plate 16 adjacent the cathode 26. Oxygen from an oxygen or air source (not shown) flows through the at least one channel 32n and to the cathode 26. The hydrogen protons that migrate through the PEM 18 combine with the oxygen and electrons returning from the external circuit 30 to form water and heat.

As apparent to those of ordinary skill any number of fuel cells 10 may be combined to form a fuel cell stack (not shown). Increasing the number of cells 10 in a stack increases the voltage output by the stack. Increasing the surface area of the cells 10 in contact with the MEA 12 increases the current output by the stack.

SUMMARY

A fuel cell system includes a bipolar plate having a flow field formed therein. The flow field is partially defined by at least two adjacent channel portions separated by a wall portion. The wall portion includes a surface at least partially defining a passageway between the channel portions. The passageway is sized so as to create a pressure difference between the channel portions. The pressure difference draws at least a portion of a liquid droplet obstructing one of the channel portions toward and into the passageway.

A fuel cell system includes a pair of flow-field plates and a membrane electrode assembly sandwiched between the flow-field plates. At least one of the flow-field plates includes a surface defining at least two adjacent channel portions and a wall portion separating the channel portions. The channel portions are configured to deliver a fluid to the membrane electrode assembly. The wall portion has perforations that create a pressure difference between the channel portions. The pressure difference moves a liquid droplet obstructing one of the channel portions through the one channel portion.

An automotive fuel cell stack includes a plurality of fuel cells. Each of the fuel cells includes at least one flow-field plate having a flow field at least partially defined by two adjacent channel portions separated by a wall portion. The wall portion includes a surface at least partially defining a passageway between the channel portions. The passageway is at least one of shaped, textured and coated so as to create a surface tension gradient between the surface at least partially defining the passageway and a surface of one the channel portions obstructed by a liquid droplet. The surface tension gradient draws at least a portion of the liquid droplet into the passageway.

While certain embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
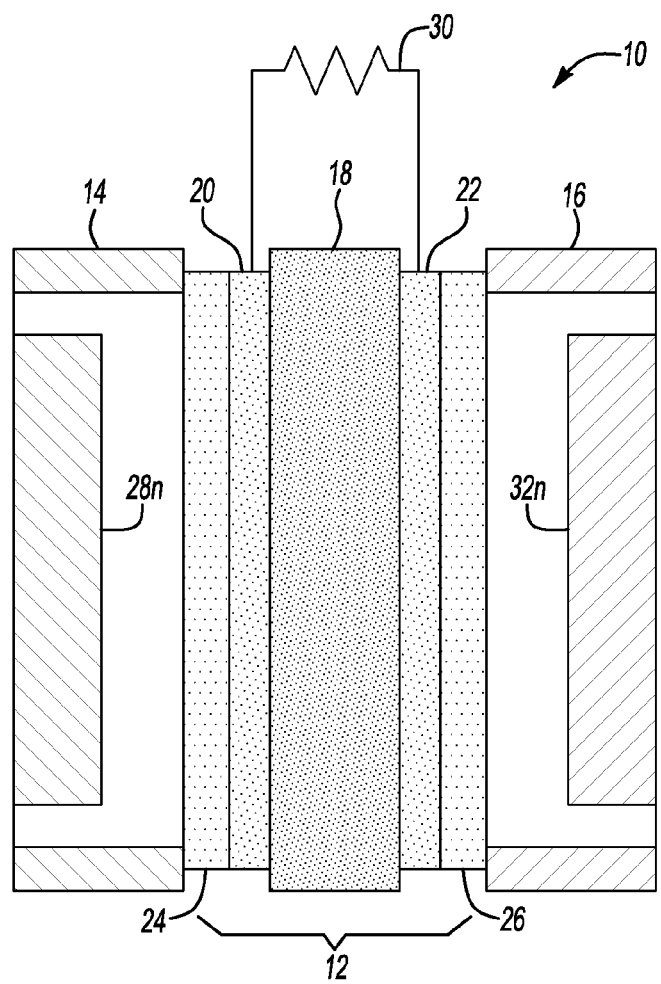
FIG. 1 is a side view, in cross-section, of a portion of a prior art fuel cell.
Figure 2:
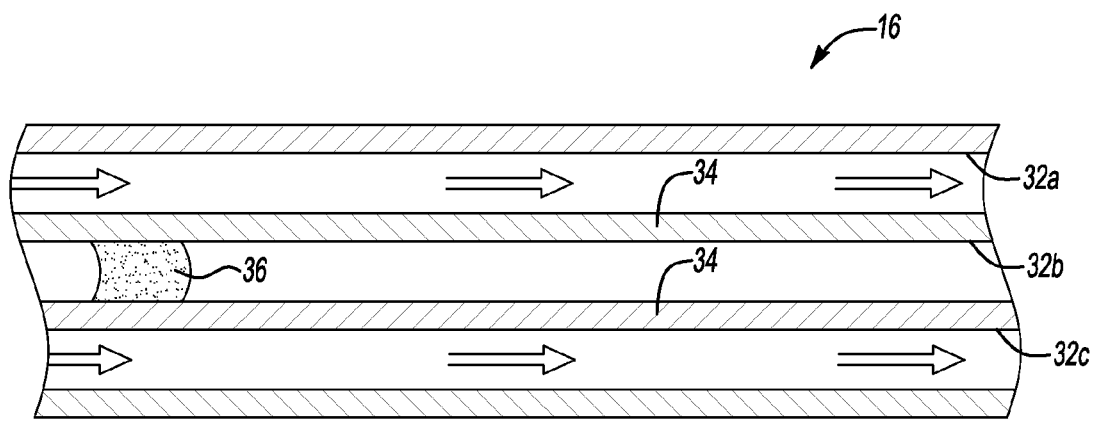
FIG. 2 is a plan view of a portion of a flow-field plate of FIG. 1.

Referring now to FIG. 2, the flow-field plate 16 includes several parallel channels 32n, i.e., 32a, 32b, 32c. The channels 32n are separated by wall portions 34. In the illustration of FIG. 2, the flow of oxygen is indicated by arrow.

A droplet of water 36 has condensed and filled the entire cross-section of the channel 32b thus obstructing the flow of oxygen downstream of the droplet 36. This flooding of the channel 32b may affect the durability of the fuel cell 10, may cause non-uniform distribution of reactants to the channels 32n, may cause non-uniform current generation by the fuel cell 10 and/or may affect the performance of the fuel cell 10.

The flooding of channel 32b may also promote flooding in the channels 32a, 32c. The stagnant zone downstream of the droplet 36 may generate an increased electrical load for other active areas thus making water generation and flooding more probable in these otherwise active areas. This propagation of flooding may affect the operation of the fuel cell 10.

Figure 3A:
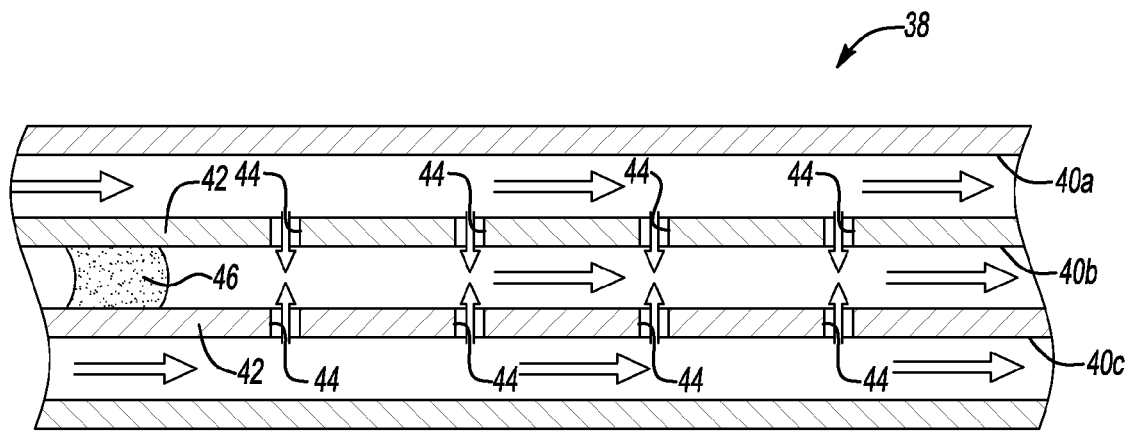
FIGS. 3A and 3B are plan views of a portion of a flow-field plate according to an embodiment of the invention.
Figure 3B:
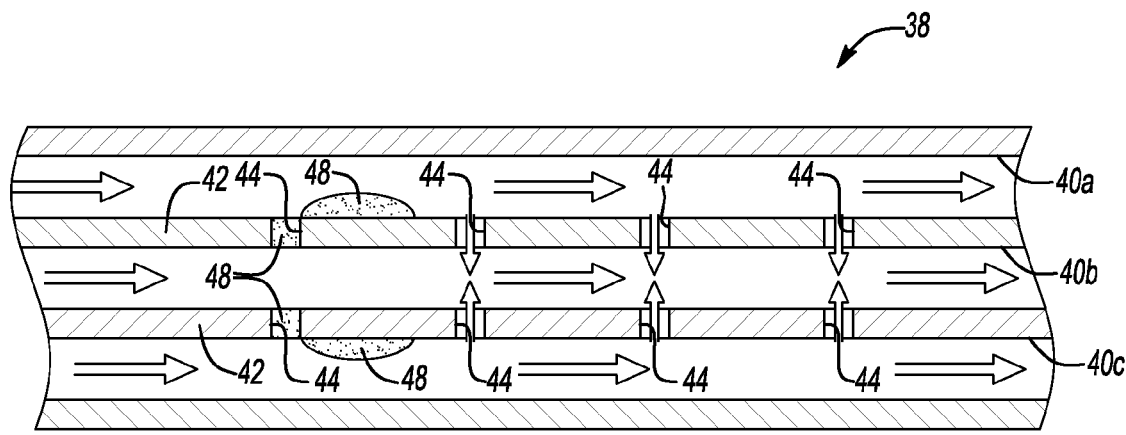

Referring now to FIGS. 3A and 3B, an embodiment of a flow-field plate 38 includes substantially parallel channels 40n, i.e., 40a, 40b, 40c. In other embodiments, a fewer or greater number of channels 40n may be used. These channels 40n may form a spiral, "S," or other desired shape on a face of the flow-field plate 38 configured to be in contact with a membrane electrode assembly (MEA) (not shown).

The channels 40*n* share a common fluid source (not shown) and fluid sink (not shown) as known in the art. Oxygen, for example, may enter the flow-field plate 38 through an "in" port (not shown) which fluidly communicates with each of the channels 40*a*, 40*b*, 40*c*. Water and un-reacted oxygen may exit the flow-field plate 38 though an "out" port (not shown) which also fluidly communicates with each of the channels 40*a*, 40*b*, 40*c*. Other configurations are also possible.

The channels 40*n* are separated by wall portions 42 (current collectors, landing areas, etc.) The wall portions 42 include passageways 44 that fluidly connect adjacent channels 40*n*. In the embodiment of FIGS. 3A and 3B, the passageways 44 are formed at regular intervals along the channels 40*n*. The passageways 44 may be formed at intervals from 10 to 100 times the hydraulic diameter, $D_h$, of one of the channels 40*n* (where $D_h$=4×cross sectional area of the channel/perimeter of the channel). In other embodiments, the passageways 44 may be formed at irregular intervals, staggered intervals, in an alternating pattern or as design considerations dictate. As explained below, the passageways 44 are sized so as to draw condensed water from the channels 40*n* into the passageways 44 to reduce and/or prevent flooding of the channels 40*n*.

As illustrated in FIG. 3A, a droplet of water 46 has condensed and filled the entire cross-section of the channel 40*b*. The droplet 46 obstructs the flow of reactants (indicated by arrow), e.g., oxygen, hydrogen, air, etc., to the MEA (not shown) downstream of the droplet 46. The passageways 44, however, allow the reactants to continue flowing though the region of the channel 40*b* downstream of the droplet 46. This prevents the generation of a static (stagnant) zone downstream of the droplet 46. Due to lower pressures in the channels 40*a* and 40*c*, and 40*b* downstream of the droplet 46 (relative to a pressure in the channel 40*b* upstream of the droplet 46), the droplet 46 travels down the channel 40*b* until it encounters at least one of the passageways 44. The droplet 46 is then drawn into these passageways 44.

As illustrated in FIG. 3B, the droplet 46 illustrated in FIG. 3A has dispersed into smaller droplets 48 that may be carried with the flow of oxygen and/or may vaporize by virtue of the high flow velocity in the channels 40*n*.

Figure 4C:
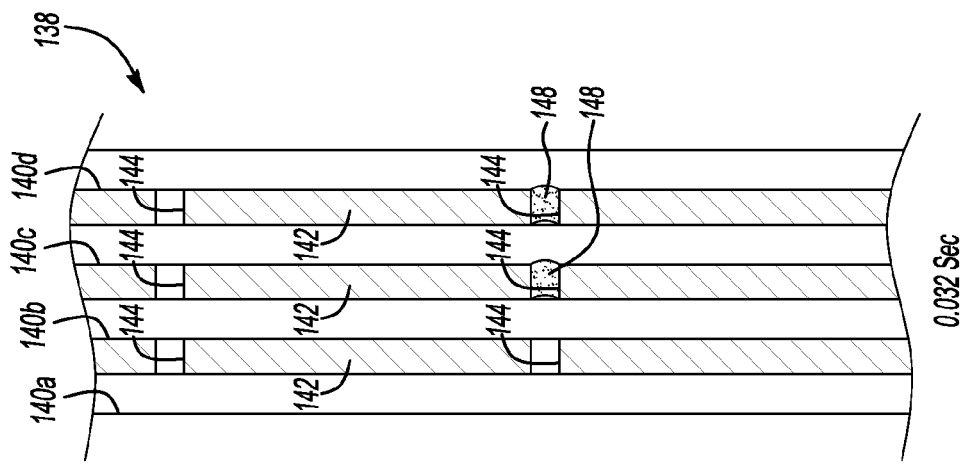
FIGS. 4A through 4C are plan views of a computational fluid dynamic model of a portion of another flow-field plate at several simulated instances of time.
Figure 4B:
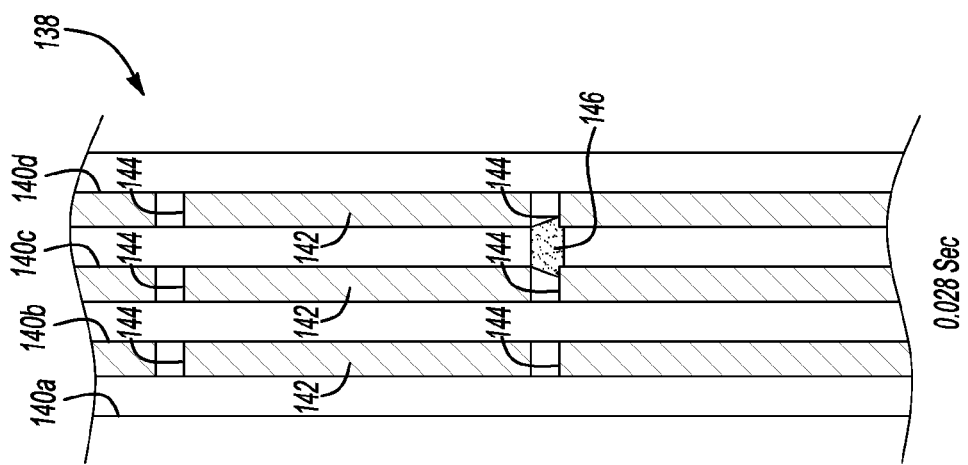
Figure 4A:
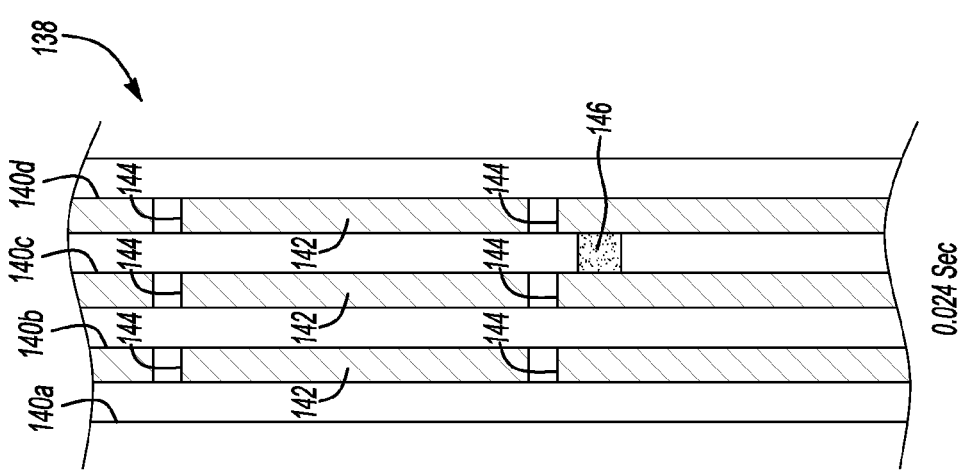

Referring now to FIGS. 4A through 4C, numbered elements of FIGS. 4A through 4C that differ by 100 relative to numbered elements of FIGS. 3A and 3B have similar, although not necessarily identical, descriptions to the numbered elements of FIGS. 3A and 3B. A computational fluid dynamic model of a flow-field plate 138 includes generally parallel channels 140*n*, i.e., 140*a*, 140*b*, 140*c*, 140*d*, separated by wall portions 142. Passageways 144 formed in the wall portions 142 fluidly connect adjacent channels 140*n*.

The passageways 144 are sized so as to create a pressure gradient that will drive water droplets in the channels 140*n* toward and into the passageways 144. For example, the passageways 144 may have a hydraulic radius of less than half of that for one of the channels 140*n* (yet be large enough to avoid issues related to surface tension and capillary forces that may make purging and removing water droplets difficult.) If the passageways 144 are too large (for example, large enough to promote cross-flow, i.e., uniform pressure, between the channels 140*n*), such a pressure gradient will not exist and water droplets may still form and stall within the channels 140*n*.

Values of the parameters associated with the model are listed in Table 1. Of course, other values are also possible as dictated by design and/or performance considerations.

TABLE 1

| Channel Height | 787.4 microns |
|---|---|
| Channel Width | 1016 microns |
| Passageway Height | 500 microns |

TABLE 1-continued

| Passageway Width | 500 microns |
|---|---|
| Flow Rate | 1e−5 kilograms/second |
| Contact Angle | 110 degrees |
| Droplet Thickness | 1 millimeter |

As illustrated in FIG. 4A (time=0.024 sec.), the droplet 146 fills the entire cross section of the channel 140*c*. The droplet 146 starts to be drawn into two of the passageways 144 as illustrated in FIG. 4B (time=0.028 sec.) As illustrated in FIG. 4C (time=0.032 sec.), the droplet 146 has been removed from the channel 140*c* and resides within the two passageways 144 as droplets 148.

As apparent to those of ordinary skill, the mechanism by which the droplet 146 enters the passageways 144 is governed by the transport of mass, momentum, energy, charge and species through the fuel cell components, such as a gas diffusion layer (not shown) and catalyst layer (not shown), and the channels 140*n*.

The passageways 144 illustrated in FIGS. 4A through 4C are defined by straight edges. In other embodiments, the edges that define the passageways 144 may be curved or otherwise shaped as desired. Certain shapes, textures and/or coatings of the passageways 144 may create a surface tension gradient between, for example, a surface defining one of the passageways 144 if adjacent to the droplet 146 and a surface of the channel 140*n* in which the droplet 146 resides. As apparent to those of ordinary skill, design considerations and operating parameters of the fuel cell, such as temperature, flow velocity, etc., may influence the selection of the particular shape, texture and/or coating used.

The permeability of any porous components, such as the gas diffusion layer (not shown) and catalyst layer (not shown), and/or the droplet interaction with the surfaces (hydrophobicity/hydrophilicity) of the channels 140*n* and edges of the passageways 144 may have an effect on the geometric design and effectiveness of the passageways 144 to remove water. Operating parameters, such as flow velocity, operating temperature, etc., may also have an effect on the geometric design and effectiveness of the passageways 144 to remove water.

A full multiphase computational fluid dynamic or finite element study similar to that illustrated in FIGS. 4A through 4C (or experimentation) may be required to size/design the passageways 144. In lieu of such a study, an analysis based on the Bernoulli equation may provide some insight into droplet movement.

The general form of the Bernolli equation is:

$$\frac{p_1}{\rho} + \frac{1}{2}V_1^2 + gz_1 = \frac{p_2}{\rho} + \frac{1}{2}V_2^2 + gz_2 = const.$$

According to the above, with subscript 1 referring to quantities in the flooded channel 140*c* downstream of the droplet 146 (which is stagnant, i.e., flow velocity $V_1 \approx 0$, $z_1 = z_2$), and subscript 2 referring to quantities in the channel 140*b* or 140*d* we have $$\frac{p_1}{\rho} = \frac{p_2}{\rho} + \frac{1}{2}V_2^2 = \text{const\_1}.$$

Because $V_2 \neq 0$ in order for this equality to hold true, we must have $p_1 > p_2$ which indicates the generation of a pressure gradient that pushes the droplet 146 from the flooded channel 140*c* to at least one of the passageways 144.

Figure 5:
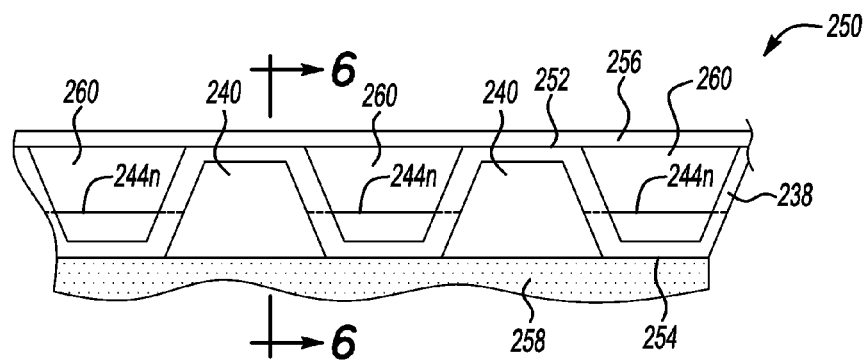
FIG. 5 is an end view of a portion of a fuel cell according to an embodiment of the invention.

Referring now to FIG. 5, numbered elements of FIG. 5 that differ by 200 relative to numbered elements of FIGS. 3A and 3B have similar, although not necessarily identical, descriptions to the numbered elements of FIGS. 3A and 3B. A fuel cell 250 includes a corrugated flow-field plate 238 having opposing face portions 252, 254, a contact plate 256 in contact with, and sealed against, the face portion 252 and an MEA 258 in contact with, and sealed against, the face portion 254. The corrugated plate 238 and contact plate 256 define a plurality of channels 260 though which a coolant, such as water, may flow. The corrugated plate 238 and MEA 258 define a plurality of channels 240 through which a fuel, reactant, etc., may flow.

Figure 6:
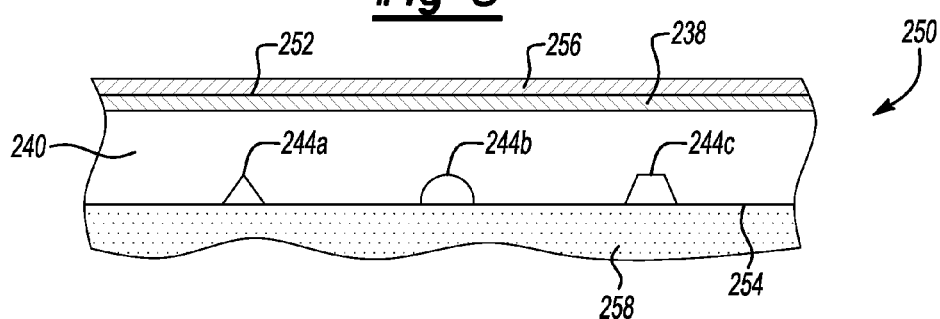
FIG. 6 is a side view, in cross-section, of the fuel cell of FIG. 5 taken along line 6-6 of FIG. 5.

Referring now to FIG. 6, passageways 244n, i.e., 244a, 244b, 244c, are formed within the corrugated plate 238 and extend to the MEA 258. That is, in the embodiment of FIG. 6, the MEA 238 partially defines the passageways 244n. The passageway 244a has a V-shape, the passageway 244b has a U-shape and the passageway 244c has a polygonal shape. Of course, the passageways 244n may all have the same shape. Other shapes and positions are also possible.

Figure 7:
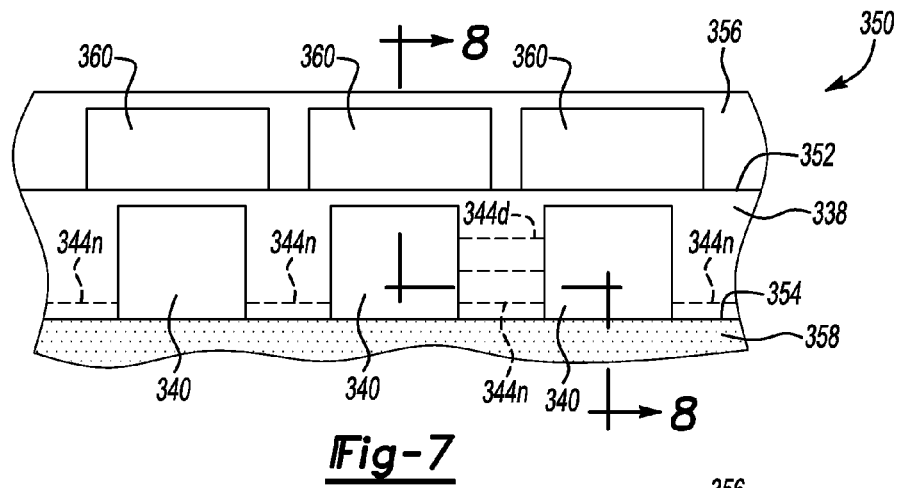
FIG. 7 is an end view of a portion of a fuel cell according to another embodiment of the invention.

Referring now to FIG. 7, numbered elements of FIG. 7 that differ by 300 relative to numbered elements of FIGS. 3A and 3B have similar, although not necessarily identical, descriptions to the numbered elements of FIGS. 3A and 3B. A fuel cell 350 includes a flow-field plate 338 having opposing face portions 352, 354, a cooling plate 356 in contact with, and sealed against, the face portion 352 and an MEA 358 in contact with, and sealed against, the face portion 354. A plurality of channels 360 are formed within the cooling plate 356. The channels 360 deliver a coolant, such as water, to the face portion 352 to cool the flow-field plate 338. A plurality of channels 340 are formed within the flow-field plate 338. The channels 340 deliver a fuel, reactant, etc., to the MEA 358.

Figure 8:
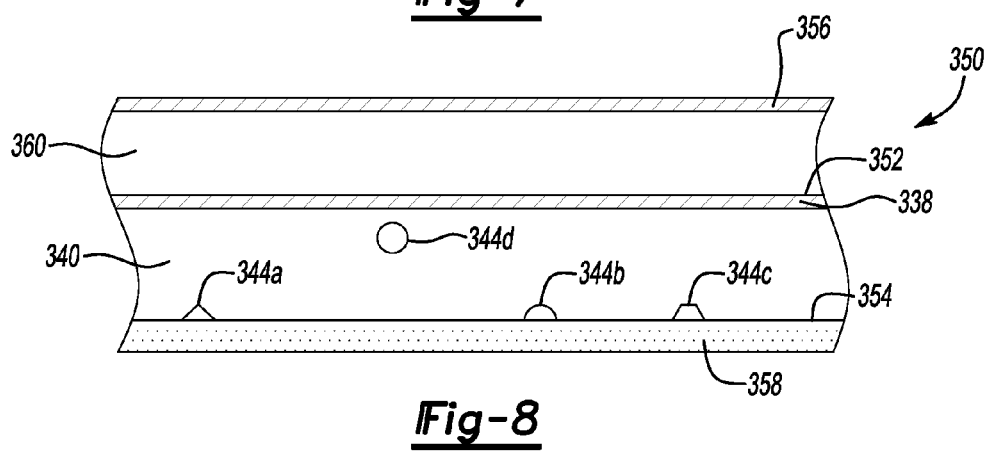
FIG. 8 is a side view, in cross-section, of the fuel cell of FIG. 7 taken along line 8-8 of FIG. 7.

Referring now to FIG. 8, passageways 344n, i.e., 344a, 344b, 344c, 344d are formed within the flow-field plate 338. The passageways 344a, 344b, 344c extend to the MEA 358. The passageway 344d is formed completely within the flow-field plate 338. Other embodiments, such as the embodiment of FIGS. 5 and 6, may also include passageways completely formed within the flow-field plate. (If passageways are formed entirely within the corrugated plate 238 illustrated in FIG. 6, adjacent channels 240 may be connected by small pipes or tubes to prevent the coolant from leaking into the channels 240.)

The passageway 344a has a V-shape, the passageway 344b has a U-shape, the passageway 344c has a polygonal shape and the passageway 344d has a round shape. Of course other shapes and positions are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A fuel cell system comprising:
   a bipolar plate having a flow field formed therein, the flow field being partially defined by at least two adjacent channel portions separated by a wall portion, the wall portion including a surface at least partially defining a passageway between the channel portions, the passageway being textured or coated such that a surface tension gradient between the surface at least partially defining the passageway and a surface of one of the channel portions obstructed by a liquid droplet in a vicinity of the passageway draws at least a portion of the liquid droplet into the passageway.

2. The fuel cell system of claim 1 further comprising a membrane electrode assembly in contact with the bipolar plate and at least partially defining the passageway.

3. The fuel cell system of claim 1 wherein the passageway is completely formed within the wall portion.

4. The fuel cell system of claim 1 wherein the passageway is V-shaped, U-shaped, round or polygonal.

5. The fuel cell system of claim 1 wherein the passageway has a hydraulic radius and at least one of the channel portions has a hydraulic radius and wherein the hydraulic radius of the passageway is less than one half the hydraulic radius of the at least one channel portion.

6. The fuel cell system of claim 1 wherein a size of the passageway depends on at least one operating parameter of the fuel cell system.

7. An automotive fuel cell stack comprising:
   a plurality of fuel cells each including at least one flow-field plate having a flow field at least partially defined by two adjacent channel portions separated by a wall portion, the wall portion including a surface at least partially defining a passageway between the channel portions, the passageway being textured or coated such that a surface tension gradient between the surface at least partially defining the passageway and a surface of one the channel portions obstructed by a liquid droplet in a vicinity of the passageway draws at least a portion of the liquid droplet into the passageway.

8. The fuel cell stack of claim 7 further comprising a plurality of membrane electrode assemblies each in contact with at least one of the flow-field plates and each at least partially defining at least one of the passageways between the channel portions.

9. The fuel cell stack of claim 7 wherein the passageways are completely formed within the wall portions.

10. The fuel cell stack of claim 7 wherein the channel portions each have a width and a size of the passageways depends on the width of the channel portions.

11. The fuel cell stack of claim 7 wherein the channel portions each have a height and a size of the passageways depends on the height of the channel portions.

12. The fuel cell stack of claim 7 further comprising a plurality of membrane electrode assemblies each in contact with at least one of the flow-field plates and each having a permeability, wherein a size of the passageways depends on the permeability of the membrane electrode assemblies.

13. The fuel cell stack of claim 7 wherein each of the flow-field plates further has a hydrophobicity and wherein a size of the passageways depends on the hydrophibicity of the flow-field plates.

* * * * *